Patented Jan. 18, 1949

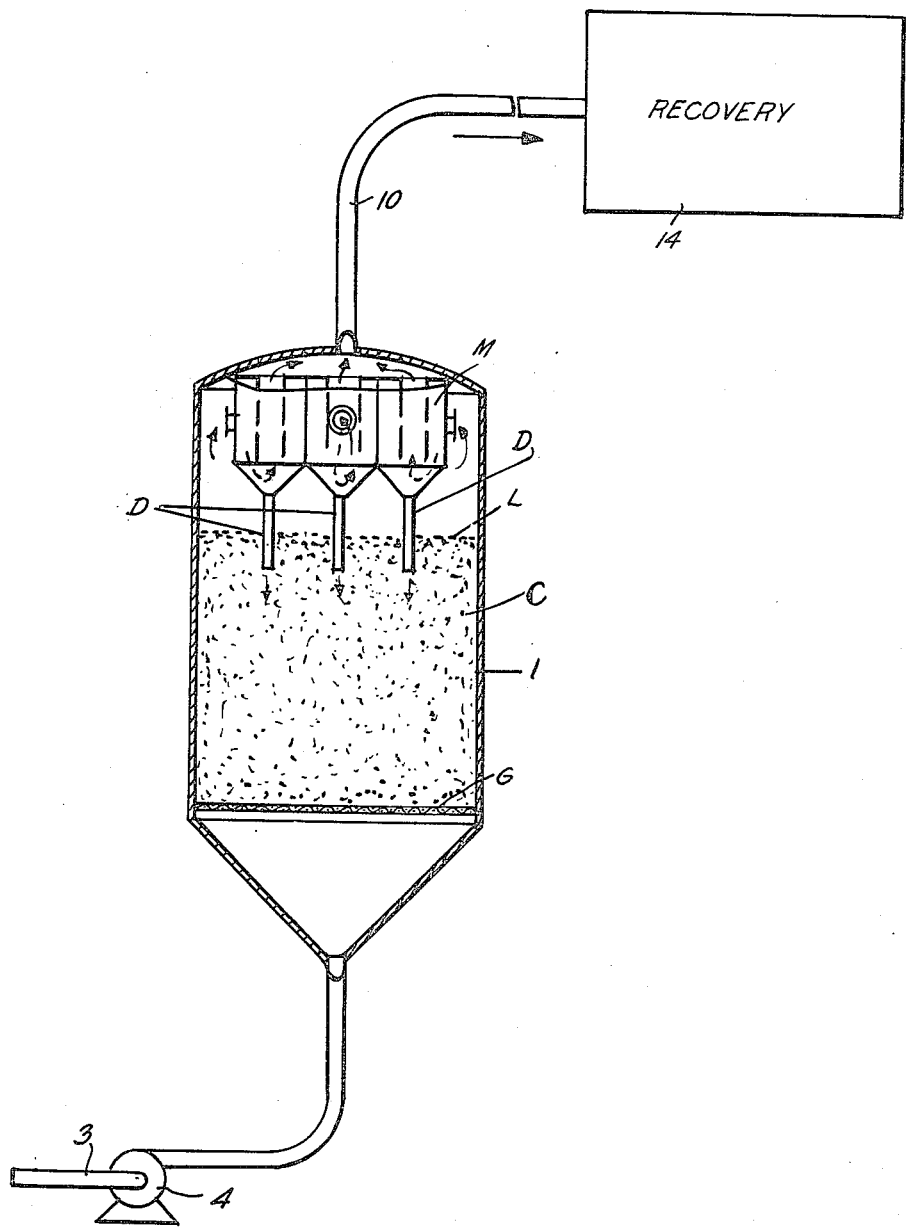

2,459,444

UNITED STATES PATENT OFFICE 2,459,444

HYDROCARBON SYNTHESIS

Thomas C. Main, San Antonio, Tex., assignor to Standard Oil Development Company, a corporation of Delaware Application November 8, 1946, Serial No. 708,626

8 Claims. (Cl. 260—449.6)

My invention relates to improvements in the synthesis of hydrocarbons and oxygenated hydrocarbons and, more particularly, it relates to improvements in the fluid catalyst type process in which the catalyst in powdered form is suspended in the gasiform material in the reaction zone to form a dense, turbulent suspension.

The synthesis of hydrocarbons and oxygenated hydrocarbons using carbon monoxide and hydrogen as the feed gas is a matter of record and commercial practice, at least in countries foreign to the United States. In the earlier work in this field, the catalyst employed generally was cobalt carried on a suitable support such as kieselguhr and promoted by material such as thoria. The reaction zone contained the catalyst in the form of pills, pellets, granules, and other shaped bodies disposed in one or more stationary or fixed beds in the reaction zone and the reactants were forced through the bed or beds of catalyst at elevated temperatures. More recently, a new technique has been developed for carrying out vapor phase reactions in the presence of a solid in which the latter is in the form of finely ground powder and further in which there is formed in the reaction zone a dense, turbulent, ebullient suspension, the powdered solids in the gasiform material passing upwardly in the reaction zone. This has come to be known as the fluid solids technique and in the case of the catalyst, of course, fluid catalyst technique. It has been found that when an attempt was made to fluidize powdered iron in the gasiform reactants in the reaction zone producing hydrocarbons from a feed containing hydrogen and CO, difficulty has been encountered in maintaining the catalyst in the fluidized state. The point is that in the hydrocarbon synthesis reaction employing iron catalyst, carbon and carbonaceous deposits form on the catalyst during the course of the reaction as time goes on, with the result that the catalyst not only loses activity but undergoes physical disintegration and it becomes difficult, if not impossible, to retain the catalyst in the reaction zone in the form of a dense, turbulent fluidized mass for the disintegrated catalyst passes overhead with the products, all of which will be more fully explained hereinafter.

At the outset, however, it is pointed out that I improved the fluidizing characteristics of the powdered iron used in the fluid catalyst process for synthesizing hydrocarbons by mixing with the iron a quantity of a coarser or larger particle size powdered inert material such as silica gel.

In the accompanying drawing, I have shown diagrammatically the essential elements of an apparatus in which a preferred modification of my invention may be performed.

Referring to the drawing, I represents a case or reactor in the form of a cylinder having a convex dome and a conical base and containing a fluidized bed of powdered iron catalyst C. The catalyst is preferably ground to a size of from 0 to 80 microns, with the major portion of the same having a particle size of from 40 to 60 microns. In operating my process, a mixture of gases containing hydrogen and carbon monoxide enters the system through line 3, is then pumped by a pump 4 into the conical base of reactor 1, wherein it then passes upwardly through a grid or a screen G into contact with the fluidized bed of catalyst previously referred to. The catalyst is maintained in the fluidized state by adjusting the inlet velocity of the entering gases within the range of from 0.1 to 1½ feet per second. By inlet velocity of the gas I mean the velocity of the same at the point just below the grid G. The reactants pass through the bed of fluidized catalyst at a temperature of around 600 to 750° F., while a pressure of from 300 to 800 pounds per square inch gauge is maintained in the reaction zone, and the desired conversion takes place. It will be noted in the drawing that the fluidized bed of catalyst has an upper level at the point L. As the gases emerge from the fluidized bed of catalyst, they pass into the space between L and the top of the reactor. The catalyst separates from the gas in this space, commonly referred to as "a disengaging space." It may have a depth of about 10 feet where the distance from G to L is of the order of 15 to 20 feet. As indicated, therefore, separation between catalyst and product is effected within the reaction zone and the gases and vapors exit through overhead transfer line 10. However, in order to separate entrained fines, the gases and vapors are forced through a plurality of solids-gas separating devices M disposed in the upper portion of the reactor as shown. These separating devices are usually centrifugal separators commonly called "cyclones" and the separated catalyst returns by gravity through a series of dip pipes D to the fluidized bed. Referring again to the material in line 10, the same may still contain at least traces of very fine entrained catalyst, and, consequently, the gases and vapors are forced through one or more separating devices or dust collectors 12 to remove the last traces of the catalyst. The gases and vapors finally freed from catalyst are then passed into a condensing, fractionating, and purifying apparatus 14, which I have merely shown diagrammatically since the methods of recovering the desired products are well known to those familiar with the art, and need not be described by me in detail therein. Of course, the skilled petroleum engineer will understand that unconverted material may be recycled or returned to the reaction zone for further treatment and those familiar with the fluid catalyst technique will appreciate that some gaseous material must be returned to the reaction zone to aid in the fluidization of the iron catalyst therein, to increase the yield of desired products and otherwise to improve the process.

The main purpose of my invention is accomplished, as indicated previously, by mixing an inert solid with the iron in the reaction zone for the purpose of insuring good fluidization of the iron catalyst. It is known that particles of highly active and selective hydrocarbon synthesis iron catalysts break down very rapidly under synthesis conditions to a very much smaller particle diameter. The mass of iron powder which once possessed good fluidization properties becomes difficultly fluidizable and the hydrocarbon synthesis operation must be discontinued. The breakdown of iron particles is probably caused by chemical reaction of iron with carbon monoxide feed. The fluffy nature of this mass makes fluidization difficult if not impossible. It is herein disclosed that a diluent solid such as silica gel, dolomite, sharp sand, or alumina which is catalytically inert in the synthesis reaction be ground to a relatively coarse particle size range, as compared to the finely divided iron powder, and added to the iron mass to give a mixture having a particle size range which falls within the class of easily fluidizable powders. The percentage of inert solid in the final mixture, as well as the average particle size, will, of course, depend upon the average particle size of the iron carbon powder mixture. For example, the iron carbon powder withdrawn from a synthesis run which was terminated because of iron particle break down had the final particle distribution shown below. It will be seen in the example given that to 500 pounds of finely divided iron a material balance on the 0 to 20 micron fraction indicates that 725 pounds of silica gel must be added which has the particle size distribution listed to give a final mixture possessing approximately 25 per cent 0 to 20 micron particles. Twenty-five per cent 0 to 20 and 25 per cent 80+ fractions permit excellent fluidization.

| Iron Catalyst | | 500 lbs. |
|---|---|---|
| Particle Distribution | Weight per cent | Lbs./500 lbs. Catalyst |
| 0–20 Micron | 55.5 | 277.0 |
| 20–40 Micron | 8.5 | 42.6 |
| 40–80 Micron | 17.2 | 86.0 |
| 80+ Micron | 18.8 | 94.4 |
| | 100.0 | 500.0 |

Silica gel: Diluent to be added to iron powder. Weight: X lbs. to give a final iron-silica gel mixture having 25% 0–20 micron particles.

| Particle Distribution | Weight per cent | Lbs./X Lbs. Silica Gel |
|---|---|---|
| 0–20 Micron | 4.0 | 0.04X |
| 20–40 Micron | 13.0 | 0.13X |
| 40–80 Micron | 37.2 | 0.372X |
| 80+ Micron | 45.8 | 0.458X |
| | 100.0 | |

Overall material balance on 0–20 micron fraction and solution for X $$(500+X)0.25 = 277.0 + 0.04X$$
$$125 + 0.25X = 277 + 0.04X$$
$$0.21X = 152$$
$$X = \frac{152}{0.21} = 725 \text{ lbs. of silica gel}$$

The final iron-silica gel powder mixture will have the following approximate particle distribution:

| | Iron | Silica Gel | Mixture | Weight per cent |
|---|---|---|---|---|
| | Lbs. | Lbs. | Lbs. | |
| 0–20 | 277.0 | 29 | 306 | 25 |
| 20–40 | 42.6 | 93 | 135.6 | 11.3 |
| 40–80 | 86.0 | 270 | 356 | 29.0 |
| 80+ | 94.4 | 333 | 427.4 | 34.7 |
| | 500.0 | 725 | 1,225.0 | 100.0 |

Weight per cent Fe in final mixture = 41%.

Due to the highly active and selective nature of the iron catalyst, diluent addition does not retard the catalyst activity in converting carbon monoxide and hydrogen to hydrocarbons, and in this connection I set forth below a pilot plant run in which the catalyst was mixed with silica gel in such proportions as to give a well fluidized mixture, as indicated by the high heat transfer coefficient, and it will also be noted that the catalyst was active in spite of the silica gel dilution as evidenced by the good yield of $C_4+$ hydrocarbons and the alcohol yield.

*Pilot plant run silica gel-iron mixture*

| | |
|---|---|
| Temp. °F | 647 |
| Pressure p. s. i. g | 399 |
| Feed rate 90.9 SCF/$H_2$+CO)/lb. Fe catalyst | |
| $H_2$/CO ratio fresh feed | 2.00 |
| Recycle ratio (volumes of fresh feed over recycled gas) | 2.00 |
| Superficial velocity of gas at reactor inlet ft./sec. | 0.89 |
| $H_2$+CO conversion percent | 86 |
| Cc. $C_4+$/$M^3$ ($H_2$+CO) consumed cc | 171 |
| Cc.[1] $C_3+$/$M^3$ ($H_2$+CO) consumed cc | 220 |
| Alcohol yield cc./$M^3$ $H_2$+CO consumed cc | 12 |
| Heat transfer coefficient B t.u./hr./sq. ft./°F | 55 |

[1] cc. $C_3+$ = cubic centimeters of liquid product containing hydrocarbons having three carbon atoms and higher boiling material, and $C_4+$ has analogous significance.

Immediately prior to silica gel addition heat transfer coefficient was 18 B. t. u./hr./sq.ft./°F.

It is desirable to select the inert as a material of less particle density than the finely divided iron-carbon mixture. A good distribution of the iron throughout the bed is insured by grinding the lighter inert to a relatively narrow cut coarse fraction since from the density standpoint the iron tends to concentrate in the lower region of the dense phase, the lighter inert powder in the upper regions; but from the standpoint of particle size, the relatively fine iron tends to move upwardly through the dense phase to the interface and the coarse inert tends to move toward the bottom. These opposing effects caused by elutriation tend to counterbalance one another, and good internal mixing of an easily fluidizable uniform powder mass results. It cannot be emphasized too strongly that poor fluidization means several disadvantages in the hydrocarbon synthesis process wherein a fluidized bed of solids is used. The catalyst if not well fluidized tends to cause "hot spots" in the bed and these hot spots may cause cracking of formed hydrocarbons with the resultant production of carbonaceous deposits on the catalyst and the production of undesired normally gaseous hydrocarbons, such as methane, thus reducing the yield of normally gaseous hydrocarbons and oxygenated hydrocarbons which, of course, are the desired products. Another difficulty is that when the catalyst becomes contaminated with carbonaceous deposits, it tends to disintegrate physically to form large quantities of fines, that is to say, particles having a size of less than 20 microns. In the operation of the fluidized mass of catalyst it is desired to maintain the catalyst in the form of a bed which remains within the reactor and does not tend to pass out of the reactor with the reaction vapors. In other words, the desideratum in the process of the type herein described is to effect a separation between gases or vapors and the catalyst within the reactor itself. The result is the formation of a lower dense phase suspension, and an upper dilute phase suspension, both types of suspension existing within the reactor, the upper dilute phase functioning as a catalyst disengaging zone. Usually in the top of the reactor there are disposed solids-gas separating devices which effect a separation of the entrained fines, as far as may be, and a return of these separated fines by gravity to the dense phase. The final result, therefore, of the operation when operating at its best is that the gasiform reactants passing from the reaction zone contain only minor traces of entrained catalyst fines. However, if the iron catalyst contains a high percentage of 0 to 20 particle size fines, then a good separation of catalyst from vapors will not occur in the upper portion of the reactor and, consequently, large quantities of these fines will pass overhead and will present a difficult problem of separating catalyst in equipment outside of the reactor. According to the present invention, however, by adding a diluent, a greater degree of catalyst fines can be tolerated in the reactor without danger of having them pass out of the reactor with the gaseous products.

Numerous modifications of my invention may be made by those who are familiar with this art without departing from the spirit thereof.

What I claim is:

1. The method of synthesizing hydrocarbons and oxygenated hydrocarbons from a gaseous feed containing carbon monoxide and hydrogen which comprises forcing a mixture of carbon monoxide and hydrogen into a reaction zone containing a bed of fluidized iron catalyst, maintaining elevated temperatures and pressures in the reaction zone, insuring good fluidization of the iron powder therein by mixing with the iron a quantity of a powdered inert material having a particle size larger than that of the powdered iron but of lower density than said iron whereby classification of the two materials is avoided and a homogeneous mixture thereof is obtained in said reaction zone and withdrawing from the reaction zone a product containing a normal liquid hydrocarbon.

2. The method set forth in claim 1 in which 25 per cent by weight of 0 to 20 microns particle size and 25 weight per cent 80+ microns particle size silica gel is added to the iron catalyst in the reaction zone.

3. The method set forth in claim 1 in which the iron powder has a particle size of from 0 to 20 microns.

4. The method set forth in claim 1 in which the diluent has a lower density than the iron catalyst.

5. The method set forth in claim 1 in which the diluent is sand.

6. In the method of synthesizing hydrocarbons and oxygenated hydrocarbons from a feed gas containing carbon monoxide and hydrogen in a process in which the feed gas is caused to flow upwardly in a reaction zone containing a fluidized bed of powdered iron catalyst under synthesizing conditions of temperature and pressure, the improvement which comprises maintaining the powdered iron catalyst in a fluidizable state for an extended period of time by admixing with said catalyst a solid diluent of lower density and larger average particle size than the said iron catalyst, the relative densities and particle sizes of the iron and the diluent being such that separation of the two is avoided and the amount of such diluent added being such that the major portion of the mixture has an average particle size in excess of 40 microns.

7. The method set forth in claim 6 in which the diluent is powdered silica gel.

8. The method set forth in claim 6 in which the diluent is sharp sand.

THOMAS C. MAIN.

REFERENCES CITED

The following references are of record in the file of this patent:

UNITED STATES PATENTS

| Number | Name | Date |
|---|---|---|
| 2,347,682 | Gunness | May 2, 1944 |
| 2,379,448 | Linn | July 3, 1945 |
| 2,393,909 | Johnson | Jan. 29, 1946 |